United States Patent
Takahashi et al.

(10) Patent No.: US 10,992,868 B2
(45) Date of Patent: Apr. 27, 2021

(54) ELECTRONIC DEVICE, IMAGE DISPLAY METHOD, NON- TRANSITORY COMPUTER-READABLE RECORDING MEDIUM STORING PROGRAM, AND IMAGE CAPTURING SYSTEM

(71) Applicant: Panasonic Intellectual Property Management Co., Ltd., Osaka (JP)

(72) Inventors: Takeshi Takahashi, Fukuoka (JP); Takanobu Machida, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/573,536

(22) Filed: Sep. 17, 2019

(65) Prior Publication Data

US 2020/0092491 A1 Mar. 19, 2020

(30) Foreign Application Priority Data

Sep. 18, 2018 (JP) .............................. JP2018-173559

(51) Int. Cl.
*H04N 5/232* (2006.01)
(52) U.S. Cl.
CPC ... *H04N 5/232933* (2018.08); *H04N 5/23206* (2013.01); *H04N 5/23299* (2018.08); *H04N 5/232939* (2018.08)

(58) Field of Classification Search
CPC ......... H04N 5/232933; H04N 5/23299; H04N 5/232122
See application file for complete search history.

(56) References Cited

U.S. PATENT DOCUMENTS

| | | | | |
|---|---|---|---|---|
| 2002/0180878 | A1* | 12/2002 | Iida | H04N 5/23299 348/333.02 |
| 2010/0173678 | A1* | 7/2010 | Kim | H04N 5/23216 455/566 |
| 2018/0234635 | A1* | 8/2018 | Hayashi | H04N 5/232933 |

FOREIGN PATENT DOCUMENTS

JP   2002-354326 A   12/2002

* cited by examiner

*Primary Examiner* — Christopher K Peterson
(74) *Attorney, Agent, or Firm* — Seed IP Law Group LLP

(57) ABSTRACT

An electronic device includes a receiver that receives image data of an image taken with a camera by wireless communication, a touchscreen that displays a camera image of the camera, and a controller that, when the touchscreen is tapped, gives the camera instructions on a capturing direction so that a tapped position of the image displayed on the touchscreen moves to the center of the touchscreen, and displays on the camera image an operation image for receiving an operation to instruct the capturing direction of the camera.

18 Claims, 7 Drawing Sheets

ELECTRONIC DEVICE, IMAGE DISPLAY METHOD, NON-TRANSITORY COMPUTER-READABLE RECORDING MEDIUM STORING PROGRAM, AND IMAGE CAPTURING SYSTEM

CROSS REFERENCE TO RELATED APPLICATIONS

This application is entitled and claims the benefit of Japanese Patent Application No. 2018-173559, filed on Sep. 18, 2018, the disclosure of which including the specification, drawings and abstract is incorporated herein by reference in its entirety.

TECHNICAL FIELD

The present disclosure relates to an electronic device, an image display method, a non-transitory computer-readable recording medium storing a program, and an image capturing system.

BACKGROUND ART

Conventionally, an image capturing system including a camera and an operation apparatus capable of remotely controlling the camera is provided. In the image capturing system, for example, there is a system that displays the camera's field of view position and target position on a scroll bar displayed on an image display section (for example, see PTL 1).

CITATION LIST

Patent Literature

PTL 1
Japanese Patent Application Laid-Open No. 2002-354326

SUMMARY OF INVENTION

Technical Problem

Users have a desire to watch an image displayed on a display apparatus as wide as possible in a range. In PTL 1, however, because the scroll bar is displayed on the display apparatus such that the camera can be remotely controlled, the camera's image range that can be viewed by users is narrowed by an amount by which the scroll bar overlaps the image.

A non-limiting embodiment of the present disclosure contributes to provision of an electronic device, an image display method, a non-transitory computer-readable recording medium storing a program, and an image capturing system that are excellent in the remote controllability of a camera and prevent the display range of a camera image from becoming narrow.

Solution to Problem

An electronic device according to one aspect of the present disclosure includes: a receiver that receives image data of an image taken with a camera, by wireless communication; a touchscreen that displays a camera image of the camera; and a controller that, when the touchscreen is tapped, gives the camera an instruction on a capturing direction so that a tapped position of the camera image displayed on the touchscreen moves to a center of the touchscreen, and displays on the camera image an operation image for receiving an operation to instruct the capturing direction of the camera.

An image display method according to one aspect of the present disclosure includes: receiving image data of an image taken with a camera, by wireless communication; displaying a camera image of the camera on a touchscreen; and when the touchscreen is tapped, giving the camera an instruction on a capturing direction so that a tapped position of the camera image displayed on the touchscreen moves to a center of the touchscreen, and displaying on the camera image an operation image for receiving an operation to instruct the capturing direction of the camera.

A non-transitory computer-readable recording medium storing a program according to one aspect of the present disclosure causes a computer to execute processing including: receiving image data of an image taken with a camera, by wireless communication; displaying a camera image of the camera on a touchscreen; and when the touchscreen is tapped, giving the camera an instruction on a capturing direction so that a tapped position of the camera image displayed on the touchscreen moves to a center of the touchscreen, and displaying on the camera image an operation image for receiving an operation to instruct the capturing direction of the camera.

An image capturing system according to one aspect of the present disclosure includes: a camera; and an electronic device including: a receiver that receives image data of an image taken with the camera, by wireless communication; a touchscreen that displays a camera image of the camera; and a controller that, when the touchscreen is tapped, gives the camera an instruction on a capturing direction so that a tapped position of the camera image displayed on the touchscreen moves to a center of the touchscreen, and displays on the camera image an operation image for receiving an operation to instruct the capturing direction of the camera.

Those comprehensive or specific aspects may be implemented by a system, an apparatus, a method, an integrated circuit, a computer program, or a recording medium, or may be implemented by an arbitrary combination of the system, apparatus, method, integrated circuit, computer program, and recording medium.

Advantageous Effects of Invention

According to one aspect of the present disclosure, the remote controllability of a camera is excellent and the display range of a camera image can be prevented from becoming narrow.

Further advantages and effects of one aspect of the present disclosure are made clear from the specification and accompanying drawings. Such advantages and/or effects are provided by respective embodiments and characteristics described in the specification and accompanying drawings, but not all necessarily need to be provided to obtain one or more identical characteristics.

DESCRIPTION OF EMBODIMENTS

Hereinafter, an embodiment of the present invention will be described in detail with reference to the accompanying drawings as appropriate. However, detailed description more than necessary may be omitted. For example, detailed description of already well-known items or redundant explanation of substantially the same configuration may be omitted. This is to prevent the following description from becoming unnecessarily redundant and to facilitate understanding by those skilled in the art.

The accompanying drawings and following description are provided in order for those skilled in the art to sufficiently understand the present disclosure and they are not intended to limit the subject matter described in the appended claims.

Figure 1:
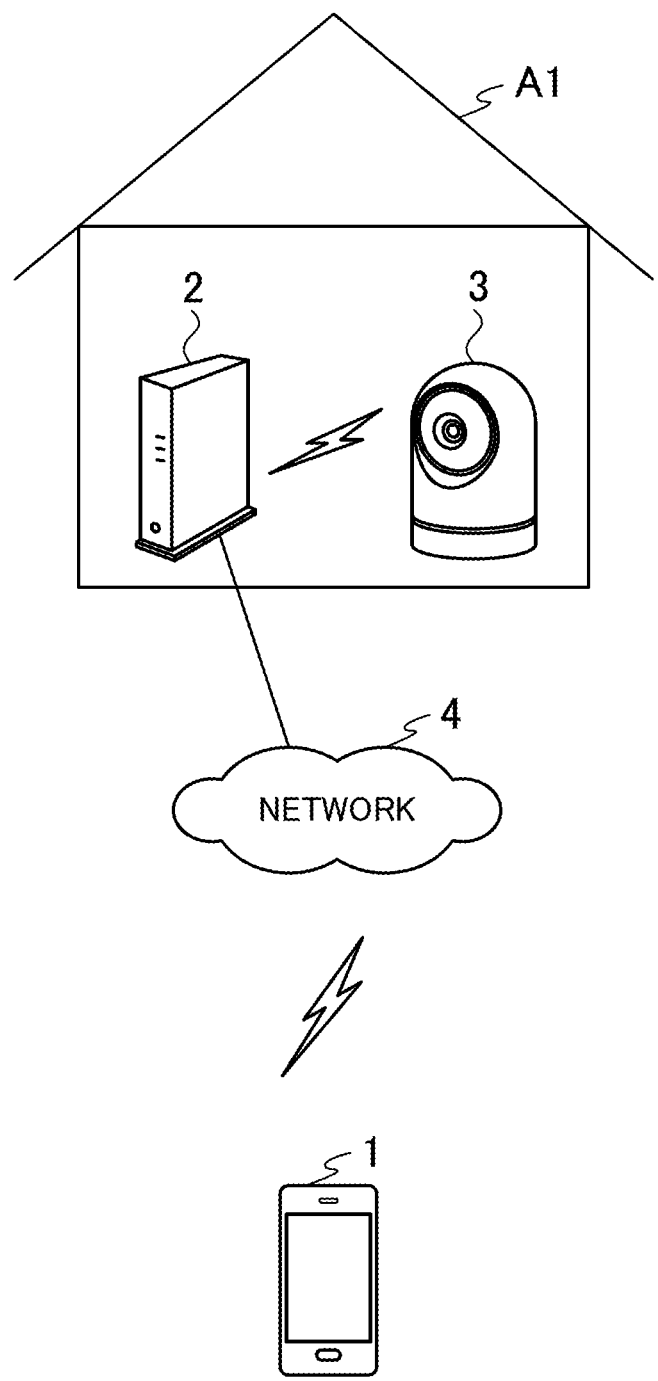
FIG. 1 illustrates a configuration example of an image capturing system according to an embodiment of the present disclosure.

FIG. 1 illustrates a configuration example of an image capturing system according to the embodiment of the present disclosure. As illustrated in FIG. 1, the image capturing system includes mobile terminal 1, router 2, and camera 3.

FIG. 1 shows building A1. Building A1 is, for example, a detached house or an apartment. Router 2 and camera 3 are installed in building A1.

The image capturing system is used, for example, to photograph a state in building A1 during absence from home. For example, the image capturing system is used to photograph the state of a pet in building A1 during absence from home. In addition, for example, the image capturing system is used for crime prevention in building A1 during absence from home.

Mobile terminal 1 is an electronic device equipped with a touchscreen, for example, a smartphone, tablet terminal, or personal computer. Mobile terminal 1 communicates with camera 3 via network 4 and router 2. Network 4 includes a network, for example, a mobile phone network and the Internet.

Camera 3 is a portable camera. Camera 3 is installed in a room desired to be monitored during absence from home, for example, a room where a pet is. Camera 3 performs wireless communication with router 2 and communicates with mobile terminal 1 via router 2 and network 4.

Camera 3 takes, for example, a moving image. A lens of camera 3 is movable in a pan direction (horizontal direction) and tilt direction (vertical direction).

A schematic operation example of the image capturing system in FIG. 1 will be described. Mobile terminal 1 is possessed by, for example, a resident of building A1 (hereinafter may be referred to as a user). The user is assumed to be out. The user is assumed to have started an application of the image capturing system installed in mobile terminal 1 while away from home.

When mobile terminal 1 starts the application of the image capturing system in response to the user's operation, mobile terminal 1 communicates with camera 3 via network 4 and router 2 and instructs camera 3 to start capturing. Mobile terminal 1 receives image data of an image taken with camera 3. Mobile terminal 1 displays the image based on the received image data on the touchscreen.

Mobile terminal 1 can remotely control the capturing direction of camera 3. For example, mobile terminal 1 instructs camera 3 to change the capturing direction in response to the user's tap operation or drag operation on the touchscreen.

That is, the user can watch the state in building A1 in real time using mobile terminal 1 even while away from home. In addition, the user can remotely control camera 3 using mobile terminal 1 from the outside and change the direction desired to be watched in building A1.

Of course, even when mobile terminal 1 is in building A1, it can display the image taken with camera 3 on the touchscreen and remotely control camera 3. When mobile terminal 1 is in building A1, it may communicate with camera 3 via router 2 without going through network 4, display the image taken with camera 3 on the touchscreen, and remotely control camera 3.

Figure 2:
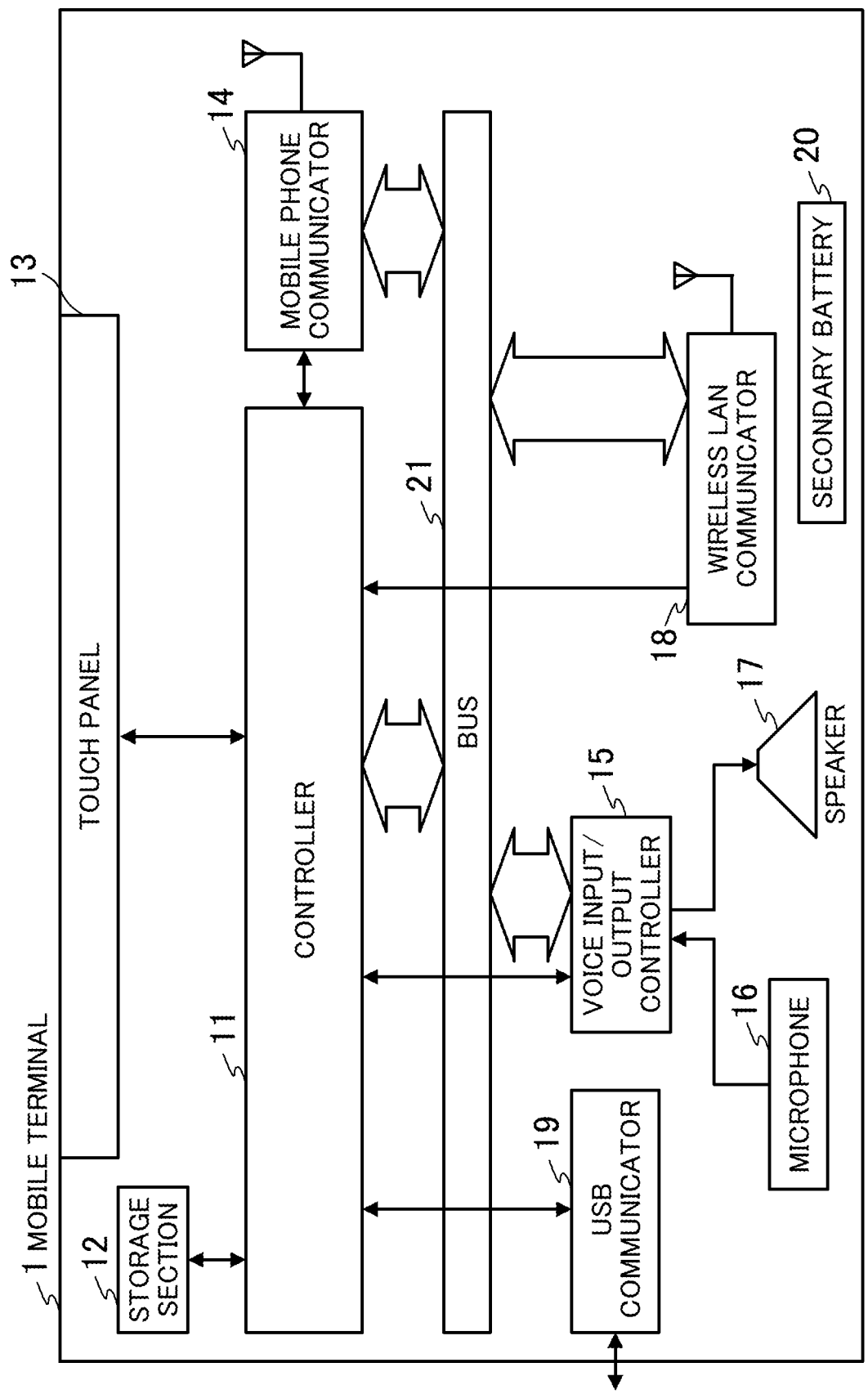
FIG. 2 illustrates a block configuration example of a mobile terminal.

FIG. 2 illustrates a block configuration example of mobile terminal 1. As illustrated in FIG. 2, mobile terminal 1 includes controller 11, storage section 12, touchscreen 13, mobile phone communicator 14, voice input/output controller 15, microphone 16, speaker 17, wireless LAN (Local Area Network) communicator 18, USB (Universal Serial BUS) communicator 19, secondary battery 20, and bus 21.

Controller 11 controls, for example, entire mobile terminal 1. Controller 11 may be composed of, for example, a CPU (Central Processing Unit).

Storage section 12 stores a program for operating controller 11. Storage section 12 stores data for controller 11 to perform calculation processing, or data for controller 11 to control components, or the like. Storage section 12 may be composed of a storage apparatus such as a RAM (Random Access Memory), a ROM (Read Only Memory), a flash memory, and an HDD (Hard Disk Drive).

Touchscreen 13 is an apparatus that includes a display apparatus for displaying an image and a transparent plate-like input apparatus for receiving a user operation on a screen of the display apparatus. Touchscreen 13 displays an image taken with camera 3. Touchscreen 13 receives, for example, the user's tap operation, drag operation, or long-depression operation, and outputs a signal corresponding to the received operation to controller 11.

Mobile phone communicator 14 wirelessly connects to network 4 using any wireless communication scheme of, for example, 3G (third generation mobile communication system), 4G (fourth generation mobile communication system), or 5G (fifth generation mobile communication system). Mobile phone communicator 14 transmits and receives data to/from another electronic device via network 4.

Voice input/output controller 15, microphone 16, and speaker 17 input or output voice from/to the outside.

Wireless LAN communicator 18 wirelessly connects to router 2 using a wireless communication scheme such as Wi-Fi (R), for example. Wireless LAN communicator 18 transmits and receives data to/from another electronic device via router 2.

USB communicator 19 transmits and receives data to/from a device, memory, or the like including a USB standard interface.

Secondary battery 20 supplies necessary power to the components of mobile terminal 1. Secondary battery 20 is a rechargeable battery such as a nickel hydrogen battery, lithium ion battery, or lead battery.

Figure 3:
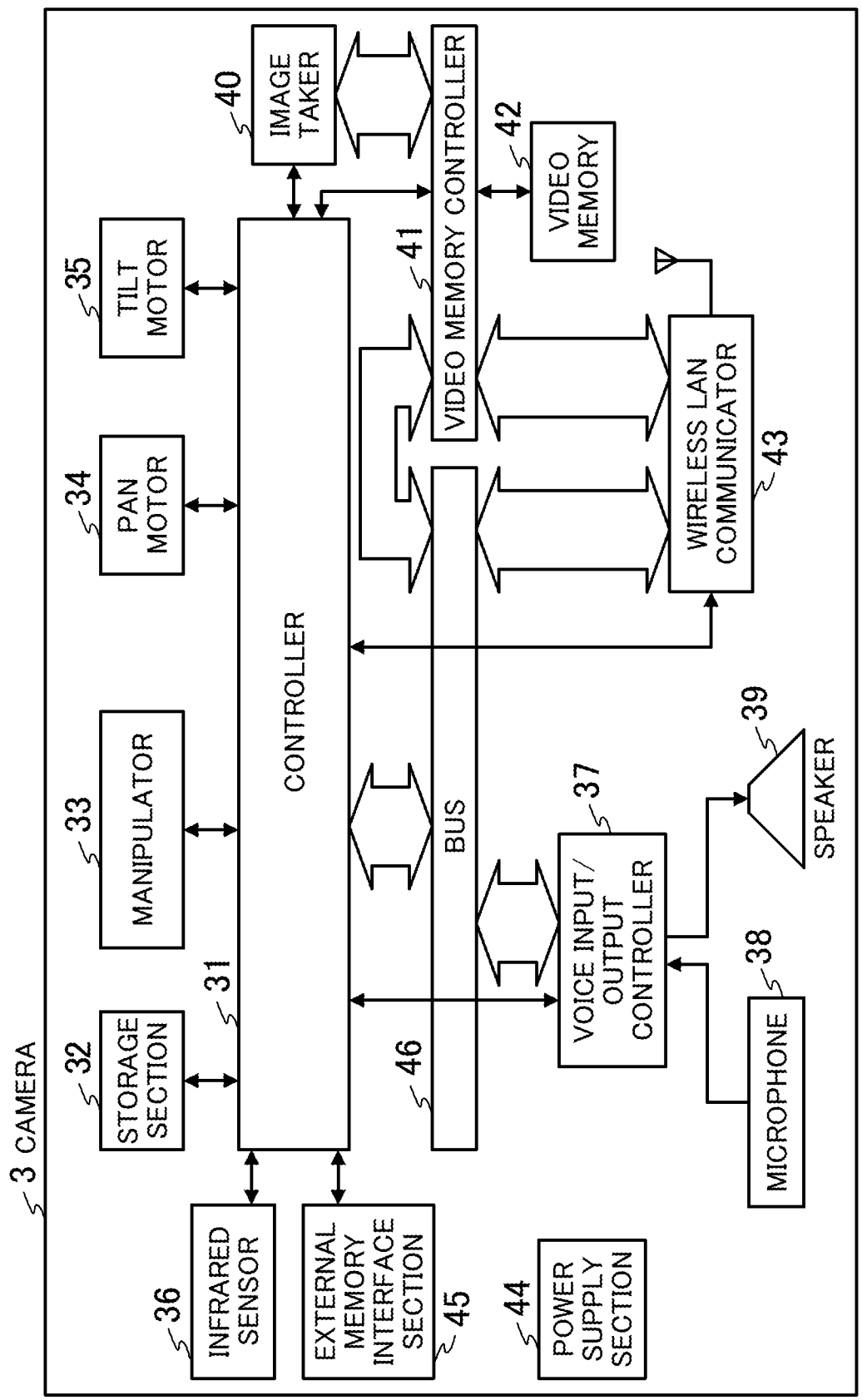
FIG. 3 illustrates a block configuration example of a camera.

FIG. 3 illustrates a block configuration example of camera 3. As illustrated in FIG. 3, camera 3 includes controller 31, storage section 32, manipulator 33, pan motor 34, tilt motor 35, infrared sensor 36, voice input/output controller 37, microphone 38, speaker 39, image taker 40, video memory controller 41, video memory 42, wireless LAN communicator 43, power supply 44, external memory interface 45, and bus 46.

Controller 31 controls, for example, entire camera 3. Controller 31 may be composed of, for example, a CPU.

Storage section 32 stores a program for operating controller 31. Storage section 32 stores data for controller 31 to perform calculation processing, or data for controller 31 to control components, or the like. Storage section 32 may be composed of a storage apparatus such as a RAM, a ROM, a flash memory, and an HDD.

Manipulator 33 is composed of buttons or the like capable of receiving the user's operation. Manipulator 33 outputs a signal corresponding to the user's operation to controller 31.

Pan motor 34 is a motor that drives image taker 40 in the pan direction on the basis of control of controller 31. Tilt motor 35 is a motor that drives image taker 40 in the tilt direction on the basis of control of controller 31.

Infrared sensor 36 is, for example, a PIR (Passive Infra-Red) sensor. For example, infrared sensor 36 detects a person.

Voice input/output controller 37, microphone 38, and speaker 39 input or output voice from/to the outside.

Image taker 40 includes a lens and an imaging element. The imaging element is an image sensor, for example, a CCD (Charged Coupled Device) or CMOS (Complementary Metal Oxide Semiconductor). Image taker 40 has a mechanism movable in the pan direction and tilt direction. Image taker 40 is movable in the pan direction and tilt direction by pan motor 34 and tilt motor 35.

Video memory controller 41 temporarily buffers (stores) a signal of voice (voice data) collected by microphone 38 together with image data output from image taker 40 in video memory 42.

Wireless LAN communicator 43 wirelessly connects to router 2 by using a wireless communication scheme such as Wi-Fi, for example. Wireless LAN communicator 43 transmits and receives data to/from another electronic device via router 2. Wireless LAN communicator 43 reads out the image data (including the voice data) stored in video memory 42 via video memory controller 41. Wireless LAN communicator 43 transmits the read-out image data to mobile terminal 1 via router 2.

Power supply 44 supplies necessary power to the components of camera 3. An external memory such as a USB memory or an SD card (R) is detachably attached to external memory interface 45. When a person is detected by infrared sensor 36, controller 31 may start capturing by image taker 40 and store the image data of image taker 40 stored in video memory 42 in the external memory.

Figure 4A:
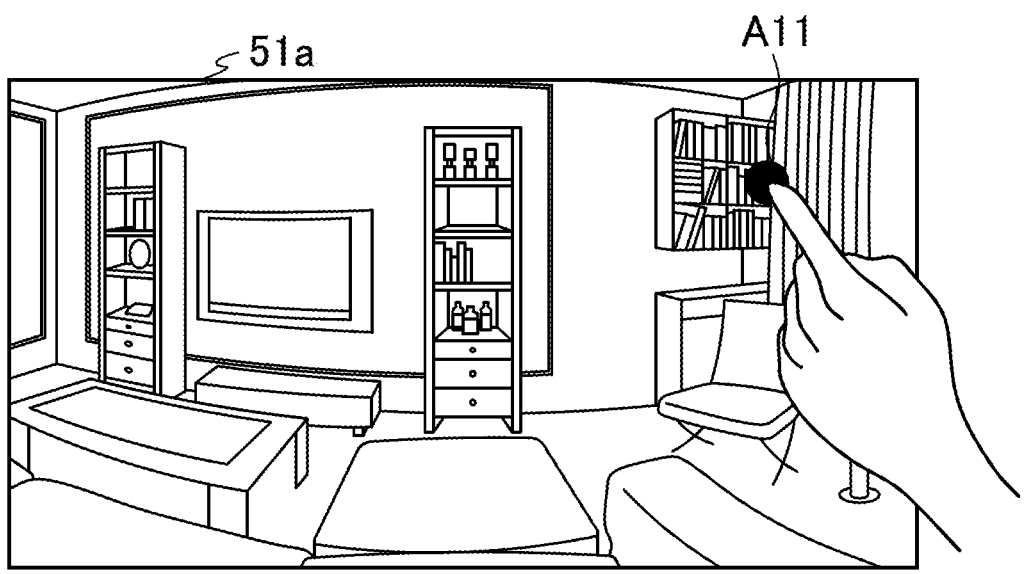
FIG. 4A is a diagram explaining pan operation and tilt operation of the camera.
Figure 4A:
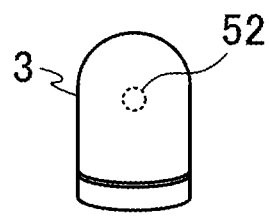
Figure 4B:
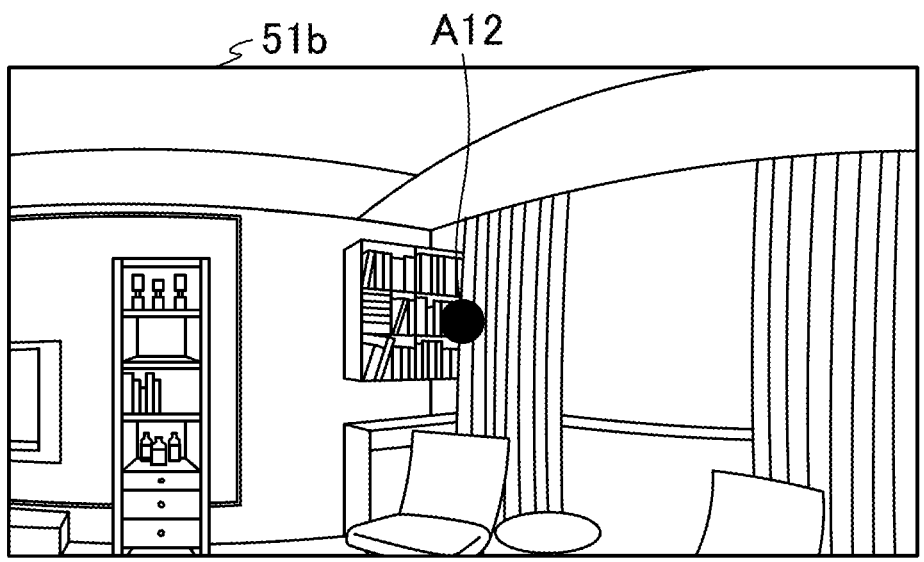
FIG. 4B is a diagram explaining pan operation and tilt operation of the camera.
Figure 4B:
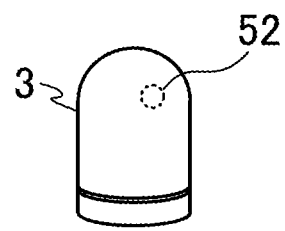

FIGS. 4A and 4B are diagrams explaining pan operation and tilt operation of camera 3. Images 51a and 51b shown in FIGS. 4A and 4B show image examples displayed on touchscreen 13 of mobile terminal 1. Also, FIGS. 4A and 4B show camera 3 equipped with lens 52. Lens 52 faces the direction of the back side of the paper. In other words, camera 3 shown in FIGS. 4A and 4B is shown from the rear side of camera 3 (a face opposite to lens 52). Camera 3 shown in FIGS. 4A and 4B has a simplified shape and the like with respect to the camera shown in FIG. 1.

Lens 52 of camera 3 shown in FIG. 4A is located at the center of a range movable in the pan direction. Lens 52 of camera 3 shown in FIG. 4A is located at the center of a range movable in the tilt direction. Image 51a of camera 3 in the described state is displayed on touchscreen 13 of mobile terminal 1. Note that camera 3 photographs a room of building A1.

Here, it is assumed that the user has tapped upper right point A11 of image 51a. Note that point A11 is shown on image 51a only for explanation and not actually displayed on image 51a.

Controller 11 of mobile terminal 1 calculates a pan operation angle and tilt operation angle of lens 52 of camera 3 so that tapped point A11 is located at the center of touchscreen 13. The pan operation angle and tilt operation angle may be absolute values or may be relative values on the basis of before movement. Controller 11 transmits the calculated pan operation angle and tilt operation angle (information on the pan operation angle and tilt operation angle) to camera 3.

Controller 31 of camera 3 drives pan motor 34 and tilt motor 35 on the basis of the pan operation angle and tilt operation angle transmitted from mobile terminal 1 and can move lens 52 (image taker 40) in the pan direction and tilt direction.

Lens 52 of camera 3 shown in FIG. 4B is shown in a state after movement on the basis of the pan operation angle and tilt operation angle transmitted from mobile terminal 1. Lens 52 of camera 3 shown in FIG. 4B has moved to the upper right with respect to lens 52 of camera 3 shown in FIG. 4A.

Image 51b shown in FIG. 4B is an image of a result of movement of lens 52 of camera 3 on the basis of the pan operation angle and tilt operation angle transmitted from mobile terminal 1. In image 51b, the position where the user has tapped (point A11 in FIG. 4A) is located at the center of the image. Note that point A12 in FIG. 4B shows a position where the user has tapped on image 51a in FIG. 4A. Point A12 is shown on image 51b only for explanation and not actually displayed on image 51b.

Camera 3 also takes an image while lens 52 is moving (until image 51a changes to image 51b) and transmits image data to mobile terminal 1. That is, camera 3 also continues capturing while lens 52 is moving to the target pan operation angle and tilt operation angle (pan operation angle and tilt operation angle calculated by mobile terminal 1) and transmits image data to mobile terminal 1. Therefore, an image is displayed on touchscreen 13 so that the position of the image tapped by the user gradually moves to the center.

When the screen (image) of touchscreen 13 is tapped, mobile terminal 1 displays slide-bars on touchscreen 13. The user can operate the slide-bars displayed on touchscreen 13 and further move the pan direction and tilt direction of camera 3. Mobile terminal 1 erases the slide-bars from touchscreen 13 when camera 3 faces the target pan direction and tilt direction.

Figure 5A:
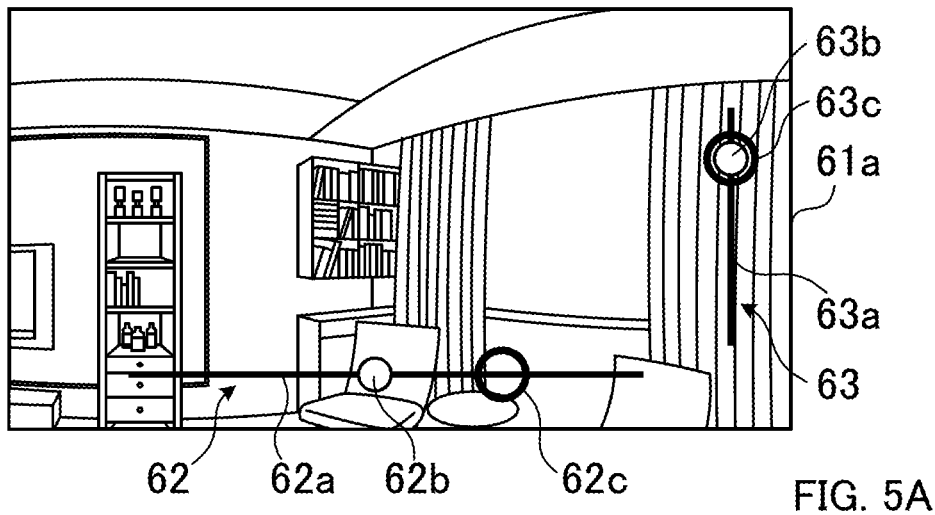
FIG. 5A is a diagram explaining a display example of slide-bars.
Figure 5B:
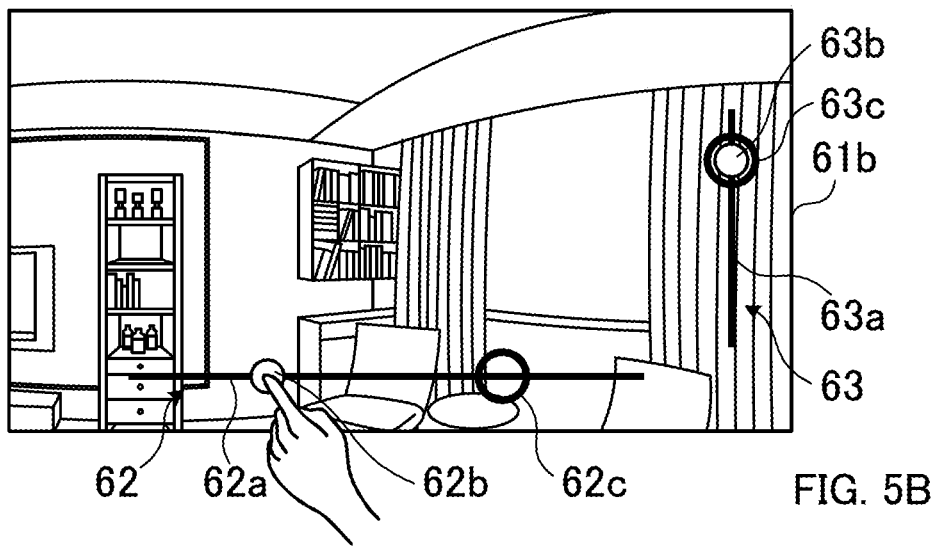
FIG. 5B is a diagram explaining a display example of the slide-bars.
Figure 5C:
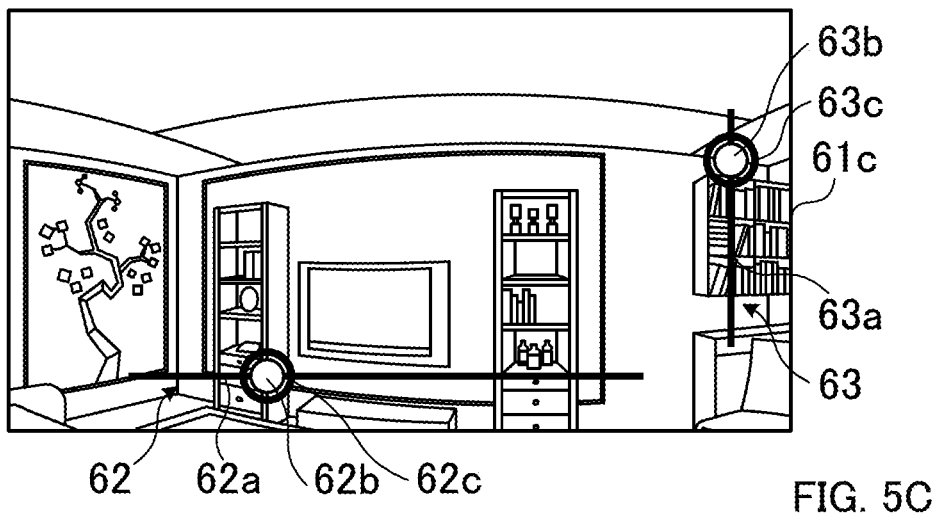
FIG. 5C is a diagram explaining a display example of the slide-bars.

FIGS. 5A, 5B, and 5C are diagrams explaining a display example of the slide-bars. Images 61a to 61c shown in FIGS. 5A, 5B, and 5C show image examples displayed on touchscreen 13 of mobile terminal 1.

The user starts, for example, an application of the image capturing system installed on mobile terminal 1. When the application of the image capturing system is started, controller 11 of mobile terminal 1 instructs camera 3 to start capturing. Controller 11 receives data of an image taken with camera 3 and displays an image of the received image data on touchscreen 13. At this time, controller 11 does not display an operation image (slide-bars) on touchscreen 13 for remotely controlling camera 3.

When the screen of touchscreen 13 is tapped, controller 11 displays the operation image for remotely controlling camera 3 on the image of touchscreen 13. At the same time as reception of the tap operation on touchscreen 13, controller 11 displays an image so that the position of the image tapped by the user gradually moves to the center.

Image 61*a* in FIG. 5A shows an image example when touchscreen 13 of mobile terminal 1 is tapped. In image 61*a*, two slide-bars 62 and 63 are displayed. Two slide-bars 62 and 63 are displayed on touchscreen 13 when the user taps touchscreen 13.

Slide-bar 62 is displayed in a lower part of touchscreen 13. Slide-bar 62 is a slide-bar for moving camera 3 (image taker 40 of camera 3) in the pan direction. Slide-bar 62 includes straight line 62*a*, knob 62*b*, and marker 62*c*.

Straight line 62*a* is an image extending in a lateral direction (horizontal direction). Straight line 62*a* corresponds to a movable range of camera 3 in the pan direction. For example, both ends of straight line 62*a* correspond to both ends in the pan direction of camera 3.

Knob 62*b* is a disk-shaped image. Knob 62*b* is displayed on straight line 62*a*. Knob 62*b* moves according to the user's drag operation and moves on straight line 62*a*. The user moves knob 62*b* on straight line 62*a* in the leftward or rightward direction and thereby can move camera 3 in the pan direction.

A position to which knob 62*b* is moved becomes a target pan direction of camera 3. Controller 11 calculates the pan operation angle of camera 3 from the position of knob 62*b* moved by the user and transmits the calculated pan operation angle to camera 3.

Marker 62*c* is a ring-shaped image. Marker 62*c* is displayed on straight line 62*a*. Marker 62*c* has a size surrounding knob 62*b*. Marker 62*c* indicates a current pan direction of camera 3. Therefore, when knob 62*b* is moved, marker 62*c* moves toward knob 62*b*. That is, marker 62*c* indicating the current pan direction of camera 3 moves toward (follows) knob 62*b* indicating the target position in the pan direction. When camera 3 faces the target pan direction, marker 62*c* overlaps knob 62*b* and stops moving.

Slide-bar 63 is displayed in a right part of touchscreen 13. Slide-bar 63 is a slide-bar for moving camera 3 (image taker 40 of camera 3) in the tilt direction. Slide-bar 63 includes straight line 63*a*, knob 63*b*, and marker 63*c*.

Straight line 63*a* is an image extending in a longitudinal direction (vertical direction). Straight line 63*a* corresponds to a movable range of camera 3 in the tilt direction. For example, both ends of straight line 63*a* correspond to both ends in the tilt direction of camera 3.

Knob 63*b* is a disk-shaped image. Knob 63*b* is displayed on straight line 63*a*. Knob 63*b* moves according to the user's drag operation and moves on straight line 63*a*. The user moves knob 63*b* on straight line 63*a* in the upward or downward direction and thereby can move camera 3 in the tilt direction.

A position to which knob 63*b* is moved becomes a target tilt direction of camera 3. Controller 11 calculates the tilt operation angle of camera 3 from the position of knob 63*b* moved by the user and transmits the calculated tilt operation angle to camera 3.

Marker 63*c* is a ring-shaped image. Marker 63*c* is displayed on straight line 63*a*. Marker 63*c* has a size surrounding knob 63*b*. Marker 63*c* indicates a current tilt direction of camera 3. Therefore, when knob 63*b* is moved, marker 63*c* moves toward knob 63*b*. That is, marker 63*c* indicating the current tilt direction of camera 3 moves toward (follows) knob 63*b* indicating the target position of the tilt direction. When the capturing direction of camera 3 faces the target tilt direction, marker 63*c* overlaps knob 63*b* and stops moving.

When touchscreen 13 is tapped, as described above, slide-bars 62 and 63 are displayed on the screen of touchscreen 13, and the image moves so that the image at the tapped position comes to the center of touchscreen 13 at the same time (including substantially the same time, hereinafter the same). Therefore, knobs 62*b* and 63*b* of slide-bars 62 and 63 are displayed at the positions on straight lines 62*a* and 63*a* corresponding to the tapped position. Markers 62*c* and 63*c* on the slide-bars are displayed at the positions on straight lines 62*a* and 63*a* corresponding to the current capturing direction of camera 3.

Even when markers 62*c* and 63*c* are moving toward knobs 62*b* and 63*b*, the user can operate knobs 62*b* and 63*b*. For example, as shown by knob 62*b* and marker 62*c* in FIG. 5B, the user can operate knob 62*b* and move the pan direction of camera 3 even before marker 62*c* overlaps knob 62*b*. That is, the user can freely change the capturing direction of camera 3 while slide-bars 62 and 63 are displayed on touchscreen 13.

When camera 3 faces a position corresponding to the positions of knobs 62*b* and 63*b* moved by the user, markers 62*c* and 63*c* on touchscreen 13 overlap knobs 62*b* and 63*b*, respectively. FIG. 5C shows a state in which markers 62*c* and 63*c* overlap knobs 62*b* and 63*b*, respectively. Camera 3 continues capturing while fixing the pan direction and tilt direction, and transmits the image data to mobile terminal 1.

Controller 11 of mobile terminal 1 may erase slide-bars 62 and 63 from touchscreen 13 after the elapse of a certain period of time since camera 3 faced the target pan direction and tilt direction. For example, controller 11 may erase slide-bars 62 and 63 from touchscreen 13 after the elapse of three seconds since camera 3 faced the target pan direction and tilt direction. This makes the image range the user can see wider.

In a case where the user wants to move the capturing direction of camera 3 again after slide-bars 62 and 63 disappear from touchscreen 13, the user may tap the screen of touchscreen 13. This has camera 3 direct the capturing direction to the tapped direction. Slide-bars 62 and 63 are displayed on touchscreen 13 by the user's tap. Therefore, the user can operate slide-bars 62 and 63 and further move the capturing direction of camera 3.

Controller 11 may display slide-bar 62 in an upper part of touchscreen 13. Also, controller 11 may display slide-bar 63 in a left part of touchscreen 13. When camera 3 has any one of the pan mechanism and tilt mechanism, controller 11 may display the one of slide-bar 62 and slide-bar 63 on touchscreen 13.

Figure 6:
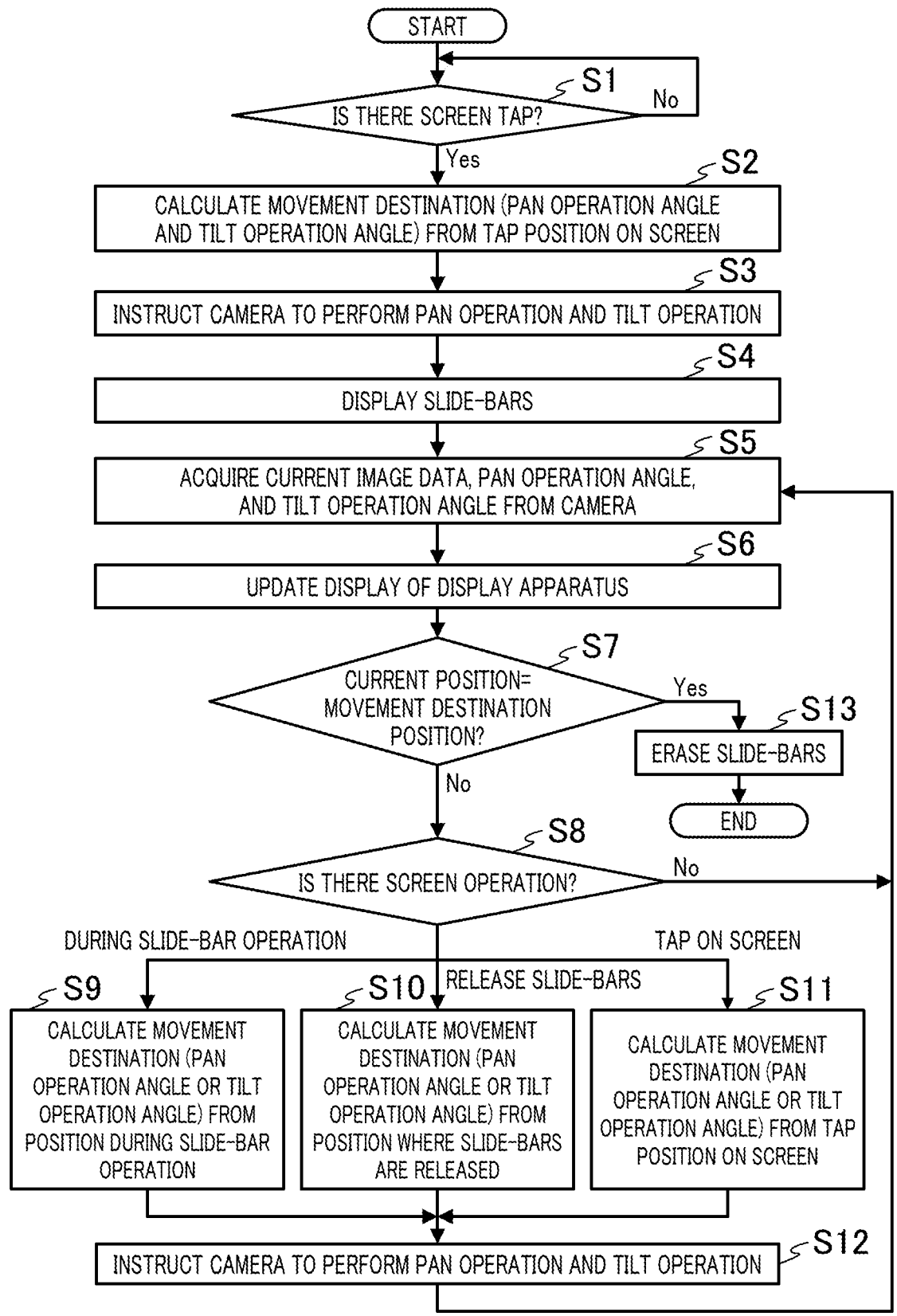
FIG. 6 is a flowchart showing an operation example in pan control and tilt control of the mobile terminal.

FIG. 6 is a flowchart showing an operation example in pan control and tilt control of mobile terminal 1. It is assumed that controller 11 has received image data transmitted from camera 3, and is displaying the image of the received image data on touchscreen 13.

Controller 11 determines whether or not there has been a tap on the screen of touchscreen 13 (step S1). When controller 11 does not determine that there has been a tap on the screen of touchscreen 13 ("No" in S1), it repeats the processing of step S1.

On the other hand, when controller 11 determines that there has been a tap on the screen of touchscreen 13 ("Yes" in S1), it calculates a movement destination (target pan operation angle and tilt operation angle) of the capturing direction of camera 3 from a tap position on the screen (step S2).

Controller 11 transmits the pan operation angle and tilt operation angle of camera 3 calculated in step S2 to camera 3 to instruct the pan operation and tilt operation (step S3). Note that camera 3 drives pan motor 34 and tilt motor 35 so that the direction in which image taker 40 faces becomes the pan operation angle and tilt operation angle instructed from controller 11. Camera 3 sequentially transmits the direction in which image taker 40 is facing (current pan operation angle and tilt operation angle at which the image is taken) to mobile terminal 1.

Controller 11 displays slide-bars for receiving operation to instruct the capturing direction of camera 3 on the screen of touchscreen 13 (step S4).

Controller 11 acquires the image data, current pan operation angle, and current tilt operation angle from camera 3 (step S5).

Controller 11 updates the display on touchscreen 13 (step S6). For example, controller 11 displays the image data received in step S5 on touchscreen 13. Controller 11 moves markers 62c and 63c of slide-bars 62 and 63 on the basis of the pan operation angle and tilt operation angle received in step S5.

Controller 11 determines whether or not the current capturing direction position of camera 3 has reached the movement destination position (position of target capturing direction) (step S7). When controller 11 determines that the current capturing direction position of camera 3 has reached the movement destination position ("Yes" in S7), it erases the slide-bars displayed on touchscreen 13 (step S13).

On the other hand, when controller 11 does not determine that the current capturing direction position of camera 3 has reached the movement destination position ("No" in S7), it determines whether or not there has been a screen operation on touchscreen 13 (step S8).

When controller 11 determines that the screen operation on touchscreen 13 is during the operation of slide-bars 62 and 63 (during dragging) ("during the operation of the slide-bars" in S8), it calculates the movement destination of the capturing direction of camera 3 from the positions of knobs 62b and 63b during dragging (step S9).

When controller 11 determines that the screen operation on touchscreen 13 is an operation releasing knobs 62b and 63b of slide-bars 62 and 63 (end of dragging) ("release the slide-bars" in S8), it calculates the movement destination of the capturing direction of camera 3 from the positions of knobs 62b and 63b after end of dragging (step S10).

When controller 11 determines that the screen operation on touchscreen 13 has been a tap on touchscreen 13 ("tap on the screen" in S8), it calculates the movement destination of the capturing direction of camera 3 from the tap position on the screen (step S11).

When calculating the movement destination of the capturing direction of camera 3 at any of steps S9-S11, controller 11 transmits a calculation result (pan operation angle and tilt operation angle) to camera 3 and instructs the pan operation and tilt operation (step S12). Then, controller 11 moves the processing to step S5.

When controller 11 does not determine there has been a screen operation on touchscreen 13 in step S8 ("No" in S8), it moves the processing to step S5.

As described above, mobile phone communicator 14 or wireless LAN communicator 18 of mobile terminal 1 receives the image data of an image taken with camera 3 by wireless communication. Touchscreen 13 displays the image received by wireless communication. When touchscreen 13 is tapped, controller 11 gives the camera 3 instructions on the capturing direction so that the tapped position of the image displayed on touchscreen 13 moves to the center of touchscreen 13, and displays on the image slide-bars 62 and 63 for receiving an operation to instruct the capturing direction of camera 3. Like this, because mobile terminal 1 displays slide-bars 62 and 63 after touchscreen 13 is tapped, the remote controllability of camera 3 is excellent and the display range of the camera image can be prevented from becoming narrow.

Generally, users first want to move camera 3 within the range of an image seen on touchscreen 13. Correspondingly, controller 11 of mobile terminal 1 receives a tap operation within the image displayed on touchscreen 13 and moves camera 3. Controller 11 displays slide-bars 62 and 63 so that users can further change the capturing direction of camera 3. Like this, because mobile terminal 1 moves camera 3 within the range of the image displayed on touchscreen 13 (moves camera 3 by a tap operation) and displays slide-bars 62 and 63 for receiving an operation to move camera 3 on the touchscreen, the remote controllability of camera 3 is excellent and the display range of the camera image can be prevented from becoming narrow.

When a user photographs the state of a range not displayed on touchscreen 13 with camera 3, the user taps touchscreen 13 (procedure 1), and operates slide-bars 62 and 63 after displaying slide-bars 62 and 63 (procedure 2). Like this, controller 11 changes the capturing direction of camera 3 (gives the camera 3 instructions on the capturing direction so that the tapped position moves to the center of touchscreen 13) at a stage where touchscreen 13 is tapped, which does not let the user feel the operation of two procedures.

Modified Example

In the above, controller 11 of mobile terminal 1 displays slide-bars 62 and 63 on touchscreen 13 when the screen of touchscreen 13 is tapped. Controller 11 may display a button for displaying slide-bars 62 and 63 on touchscreen 13.

Figure 7A:
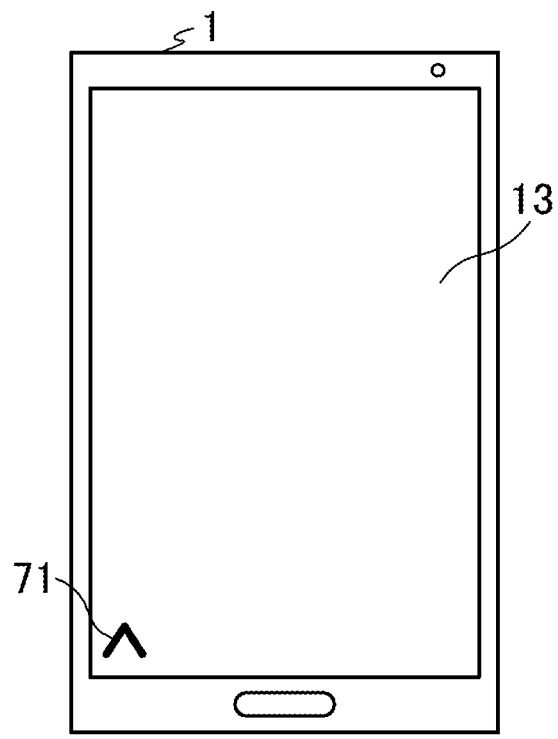
FIG. 7A is a diagram explaining an example of buttons for displaying the slide-bars.
Figure 7B:
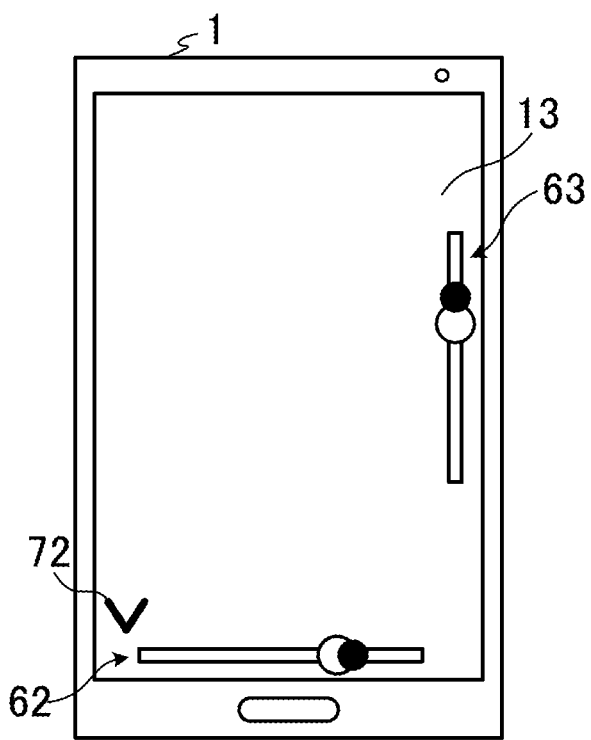
FIG. 7B is a diagram explaining an example of the buttons for displaying the slide-bars.

FIGS. 7A and 7B are diagrams explaining an example of buttons for displaying the slide-bars. FIGS. 7A and 7B show mobile terminal 1. Touchscreen 13 of mobile terminal 1 displays an image of camera 3 (in FIGS. 7A and 7B, illustration of the image of camera 3 is omitted).

As shown in FIG. 7A, the screen of touchscreen 13 is displaying button 71. Button 71 is displayed in a lower left part of touchscreen 13. Note that button 71 is not limited to the display in the lower left part of touchscreen 13. Button 71 may be displayed at an end of touchscreen 13 so as not to disturb the image of the camera 3.

Controller 11 of mobile terminal 1 displays slide-bars 62 and 63 and button 72 on touchscreen 13 as shown in FIG. 7B when button 71 shown in FIG. 7A is tapped. The user can change the capturing direction of camera 3 by operating slide-bars 62 and 63. Controller 11 erases slide-bars 62 and 63 from touchscreen 13 when button 72 is tapped.

Slide-bars 62 and 63 are also displayed on touchscreen 13 when touchscreen 13 is tapped.

Button 72 may be not displayed. Controller 11 may erase slide-bars 62 and 63 from touchscreen 13 when the capturing direction of camera 3 faces the target capturing direction.

Each of the functional blocks used for description of the embodiment is typically implemented as an LSI which is an integrated circuit. Each of them may be individually made into one chip, or part or all of them may be made into one chip. It is referred to as an LSI here, but may be referred to as an IC, a system LSI, a super LSI, and an ultra LSI according to difference in the degree of integration.

A method for circuit integration is not limited to the LSI, and may be implemented by a dedicated circuit or general-purpose processor. An FPGA (Field Programmable Gate Array) that can be programmed after manufacturing the LSI or a reconfigurable processor that can reconfigure connection and setting of circuit cells inside the LSI may be used.

Furthermore, when a circuit integration technique that replaces the LSI emerges as a result of advances in semiconductor technology or other derived techniques, naturally functional blocks may be integrated using the technique. Biotechnology or the like can be applied.

INDUSTRIAL APPLICABILITY

The present disclosure is useful for an image capturing system that remotely controls a camera installed in a building with a mobile terminal.

REFERENCE SIGNS LIST

1 Mobile terminal
2 Router
3 Camera
4 Network
A1 Building
11, 31 Controller
12, 32 Storage section
13 Touchscreen
14 Mobile phone communicator
15 Voice input/output controller
16, 38 Microphone
17, 39 Speaker
18 Wireless LAN communicator
19 USB communicator
20 Secondary battery
21, 46 Bus
33 Manipulator
34 Pan motor
35 Tilt motor
36 Infrared sensor
37 Voice input/output controller
40 Image taker
41 Video memory controller
42 Video memory
43 Wireless LAN communicator
44 Power supply
45 External memory interface
62, 63 Slide-bar
62b, 63b Knob
62c, 63c Marker
71, 72 Button

The invention claimed is:

1. An electronic device, comprising
a receiver configured to receive, by wireless communication, image data of images captured by a camera;
a touchscreen configured to display an image captured by the camera; and
a controller configured to:
detect a tap on the touchscreen at a first target position; and
in response to detecting the tap,
cause a center of a capturing direction of the camera to transition to the first target position; and
cause the touchscreen to superpose a slide bar on the image, the slide bar having a target position indicator and a current position indicator, the target position indicator indicating the first target position, the current position indicator indicating a current position of the center of the capturing direction in relation to the first target position;
update a position of the current position indicator during the transition of the center of the capturing direction to the first target position;
detect user repositioning of the target position indicator from the first target position to a second target position; and
in response to detecting the user repositioning of the target position indicator from the first target position to the second target position,
cause the center of the capturing direction of the camera to transition to the second target position; and
update the position of the current position indicator during the transition of the center of the capturing direction to the second target position.

2. The electronic device according to claim 1, wherein the slide bar includes:
a straight line image;
a knob image, as the target position indicator, that moves along the straight line image; and
a marker image, as the current position indicator, that moves along the straight line image.

3. The electronic device according to claim 2, wherein:
the straight line image includes a first straight line image extending in a lateral direction of the touchscreen and a second straight line image extending in a longitudinal direction of the touchscreen;
the knob image includes a first knob image that moves on the first straight line image associated with a pan direction of the camera, and a second knob image that moves on the second straight line image associated with a tilt direction of the camera; and
the marker image includes a first marker image that moves on the first straight line image and a second marker image that moves on the second straight line image.

4. The electronic device according to claim 1, wherein a button for displaying the slide bar is displayed on the image.

5. The electronic device according to claim 1, wherein the slide bar is removed from the touchscreen when the center of the capturing direction aligns with the second target position.

6. The electronic device according to claim 1, wherein the controller is configured to:
detect the user repositioning of the target position indicator from the first target position to the second target position during the transition of the center of the capturing direction to the first target position; and
in response to detecting the user repositioning of the target position indicator from the first target position to the second target position during the transition of the center of the capturing direction to the first target position, cease causing the center of the capturing direction of the camera to transition to the first target position.

7. An image display method, comprising:
receiving, by wireless communication, image data captured by a camera;

displaying an image captured by the camera on a touchscreen;

detecting a tap on the touchscreen at a first target position;

in response to detecting the tap,
- causing a center of a capturing direction of the camera to transition to the first target position; and
- causing the touchscreen to superpose a slide bar on the image, the slide bar having a target position indicator and a current position indicator, the target position indicator indicating the first target position, the current position indicator indicating a current position of the center of the capturing direction in relation to the first target position;

updating a position of the current position indicator during the transition of the center of the capturing direction to the first target position;

detecting user repositioning of the target position indicator from the first target position to a second target position; and in response to detecting the user repositioning of the target position indicator from the first target position to the second target position,
- causing the center of the capturing direction of the camera to transition to the second target position; and
- updating the position of the current position indicator during the transition of the center of the capturing direction to the second target position.

8. The image display method according to claim 7, comprising:
- detecting the user repositioning of the target position indicator from the first target position to the second target position during the transition of the center of the capturing direction to the first target position; and
- in response to detecting the user repositioning of the target position indicator from the first target position to the second target position during the transition of the center of the capturing direction to the first target position, ceasing causing the center of the capturing direction of the camera to transition to the first target position.

9. The image display method according to claim 7, wherein the slide bar includes:
- a straight line image;
- a knob image, as the target position indicator, that moves along the straight line image; and
- a marker image, as the current position indicator, that moves along the straight line image.

10. The image display method according to claim 9, wherein:
- the straight line image includes a first straight line image extending in a lateral direction of the touchscreen and a second straight line image extending in a longitudinal direction of the touchscreen;
- the knob image includes a first knob image that moves on the first straight line image associated with a pan direction of the camera, and a second knob image that moves on the second straight line image associated with a tilt direction of the camera; and
- the marker image includes a first marker image that moves on the first straight line image and a second marker image that moves on the second straight line image.

11. A non-transitory computer-readable recording medium storing a program that causes a computer to execute processing comprising:
- receiving, by wireless communication, image data captured by a camera;
- displaying an image captured by the camera on a touchscreen;
- detecting a tap on the touchscreen at a first target position;
- in response to detecting the tap,
  - causing a center of a capturing direction of the camera to transition to the first target position; and
  - causing the touchscreen to superpose a slide bar on the image, the slide bar having a target position indicator and a current position indicator, the target position indicator indicating the first target position, the current position indicator indicating a current position of the center of the capturing direction in relation to the first target position;
- updating a position of the current position indicator during the transition of the center of the capturing direction to the first target position;
- detecting user repositioning of the target position indicator from the first target position to a second target position; and
- in response to detecting the user repositioning of the target position indicator from the first target position to the second target position,
  - causing the center of the capturing direction of the camera to transition to the second target position; and
  - updating the position of the current position indicator during the transition of the center of the capturing direction to the second target position.

12. The non-transitory computer-readable recording medium according to claim 11, wherein the program that causes the computer to execute processing comprising:
- detecting the user repositioning of the target position indicator from the first target position to the second target position during the transition of the center of the capturing direction to the first target position; and
- in response to detecting the user repositioning of the target position indicator from the first target position to the second target position during the transition of the center of the capturing direction to the first target position, ceasing causing the center of the capturing direction of the camera to transition to the first target position.

13. The non-transitory computer-readable recording medium according to claim 11, wherein the slide bar includes:
- a straight line image;
- a knob image, as the target position indicator, that moves along the straight line image; and
- a marker image, as the current position indicator, that moves along the straight line image.

14. The non-transitory computer-readable recording medium according to claim 13, wherein:
- the straight line image includes a first straight line image extending in a lateral direction of the touchscreen and a second straight line image extending in a longitudinal direction of the touchscreen;
- the knob image includes a first knob image that moves on the first straight line image associated with a pan direction of the camera, and a second knob image that moves on the second straight line image associated with a tilt direction of the camera; and
- the marker image includes a first marker image that moves on the first straight line image and a second marker image that moves on the second straight line image.

15. An image capturing system, comprising:
- a camera; and
- an electronic device including:

a receiver configured to receive, by wireless communication, image data of images captured by the camera;

a touchscreen configured to display an image captured by the camera; and a controller configured to:
  detect a tap on the touchscreen at a first target position; and
  in response to detecting the tap,
    cause a center of a capturing direction of the camera to transition to the first target position; and
    cause the touchscreen to superpose a slide bar on the image, the slide bar having a target position indicator and a current position indicator, the target position indicator indicating the first target position, the current position indicator indicating a current position of the center of the capturing direction in relation to the first target position;
  update a position of the current position indicator during the transition of the center of the capturing direction to the first target position;
  detect user repositioning of the target position indicator from the first target position to a second target position; and
  in response to detecting the user repositioning of the target position indicator from the first target position to the second target position,
    cause the center of the capturing direction of the camera to transition to the second target position; and
    update the position of the current position indicator during the transition of the center of the capturing direction to the second target position.

16. The image capturing system according to claim 15, wherein the controller is configured to:
  detect the user repositioning of the target position indicator from the first target position to the second target position during the transition of the center of the capturing direction to the first target position; and
  in response to detecting the user repositioning of the target position indicator from the first target position to the second target position during the transition of the center of the capturing direction to the first target position, cease causing the center of the capturing direction of the camera to transition to the first target position.

17. The image capturing system to claim 15, wherein the slide bar includes:
  a straight line image;
  a knob image, as the target position indicator, that moves along the straight line image; and
  a marker image, as the current position indicator, that moves along the straight line image.

18. The image capturing system according to claim 17, wherein:
  the straight line image includes a first straight line image extending in a lateral direction of the touchscreen and a second straight line image extending in a longitudinal direction of the touchscreen;
  the knob image includes a first knob image that moves on the first straight line image associated with a pan direction of the camera, and a second knob image that moves on the second straight line image associated with a tilt direction of the camera; and
  the marker image includes a first marker image that moves on the first straight line image and a second marker image that moves on the second straight line image.

* * * * *